Figure 3:
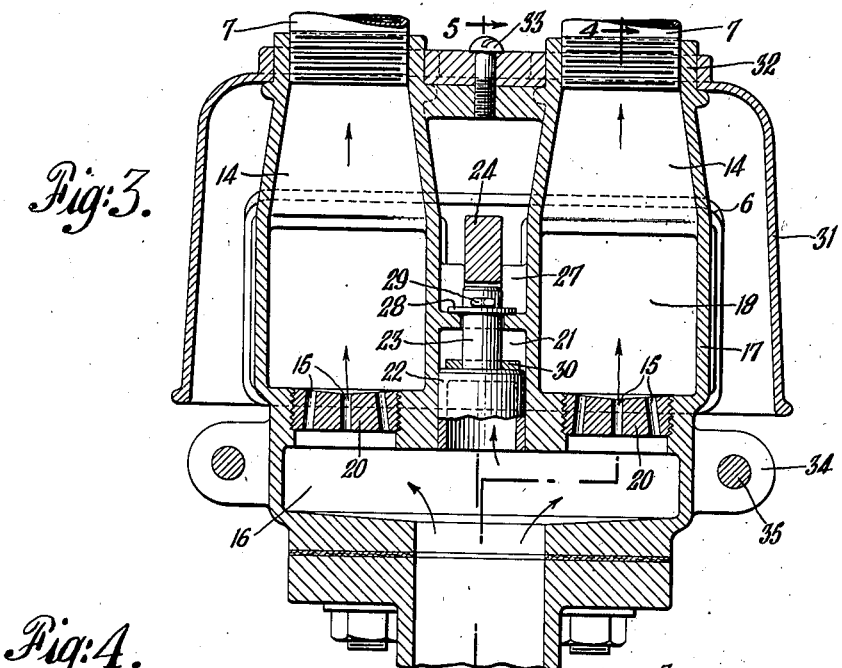

May 28, 1940.  L. G. M. TIMPSON  2,202,176
APPARATUS FOR DELIVERING AIR FOAM TO SEALED TANKS
Filed Jan. 12, 1938  3 Sheets-Sheet 1
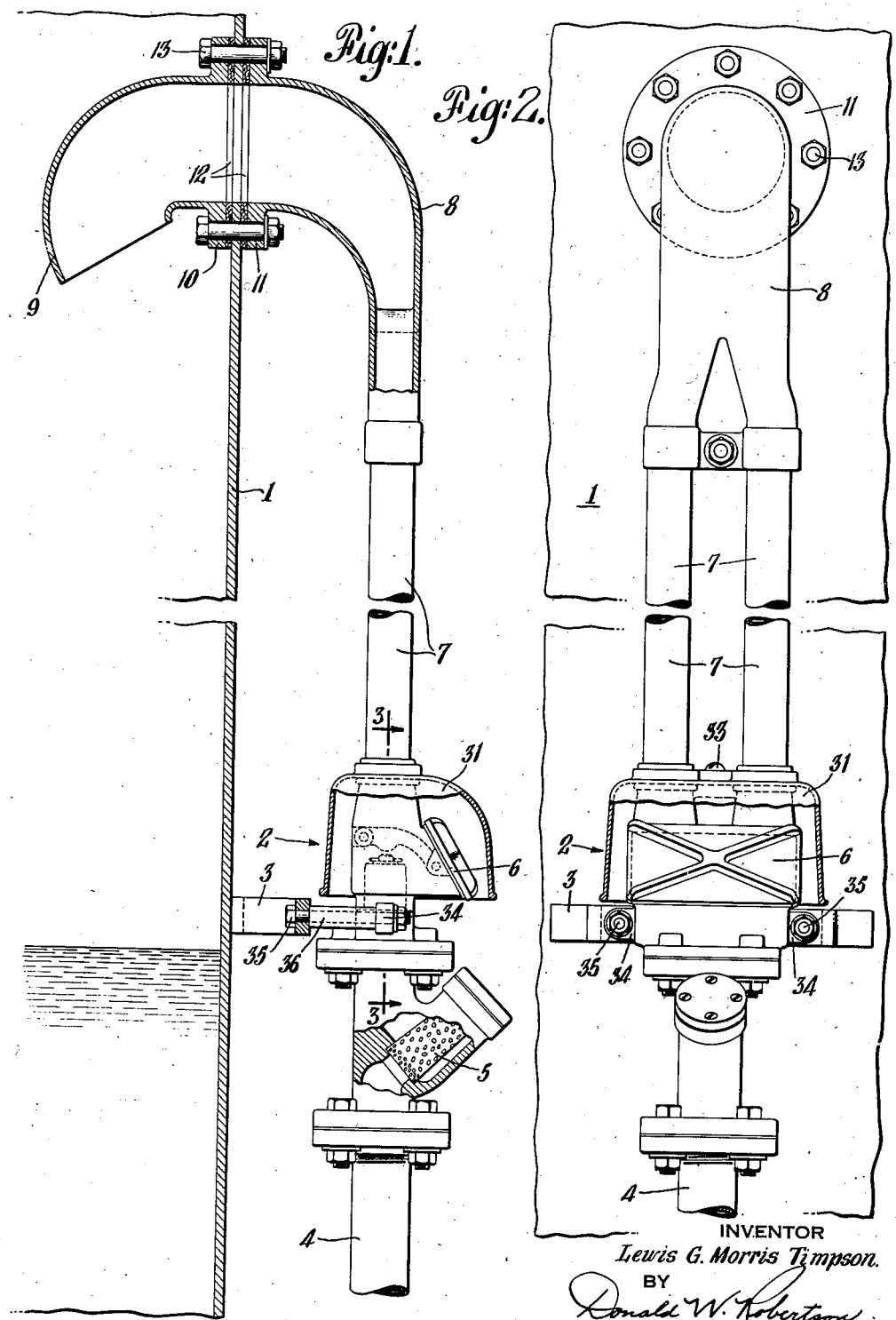
INVENTOR
Lewis G. Morris Timpson.
BY
Donald W. Robertson
ATTORNEY May 28, 1940.   L. G. M. TIMPSON   2,202,176
APPARATUS FOR DELIVERING AIR FOAM TO SEALED TANKS
Filed Jan. 12, 1938   3 Sheets-Sheet 2

INVENTOR
Lewis G. Morris Timpson.
BY
Donald W. Robertson
ATTORNEY

May 28, 1940.  L. G. M. TIMPSON  2,202,176
APPARATUS FOR DELIVERING AIR FOAM TO SEALED TANKS
Filed Jan. 12, 1938  3 Sheets-Sheet 3
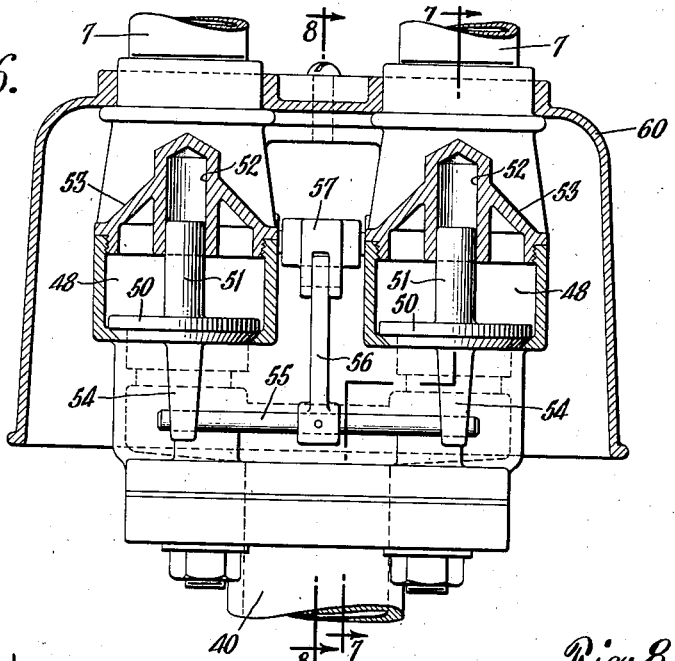
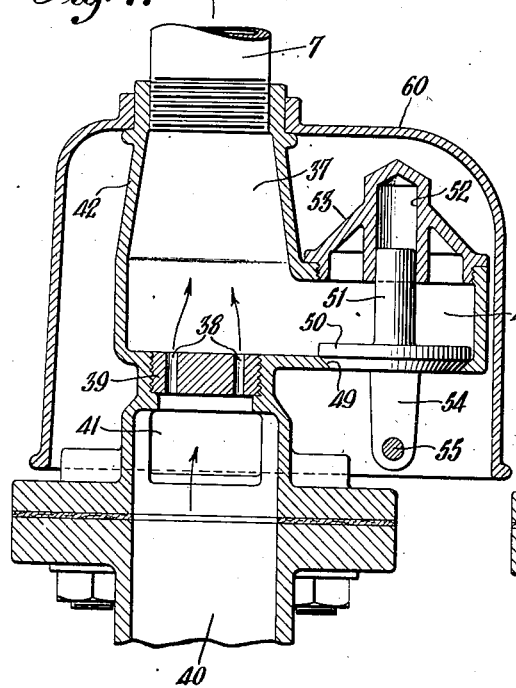
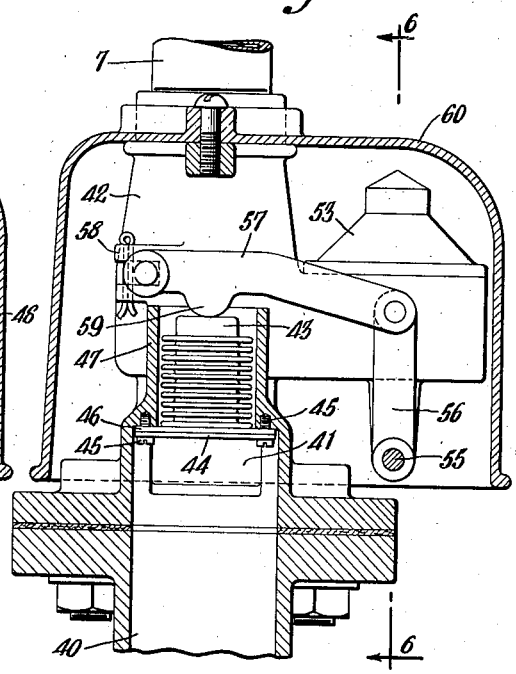
INVENTOR
Lewis G. Morris Timpson.
BY
Donald W. Robertson
ATTORNEY Patented May 28, 1940

2,202,176

UNITED STATES PATENT OFFICE 2,202,176

APPARATUS FOR DELIVERING AIR FOAM TO SEALED TANKS

Lewis G. Morris Timpson, Plainfield, N. J., assignor to Pyrene-Minimax Corporation, Newark, N. J., a corporation of Delaware Application January 12, 1938, Serial No. 184,501

4 Claims. (Cl. 261—76)

The invention relates to apparatus for delivering a fire-extinguishing foam to sealed tanks containing inflammable liquids such as oil or gasoline. More particularly it relates to method and means for effecting the admission of air to foam-producing systems associated with sealed tanks in response to the application of pressure to operate the foam-producing units of such systems.

My invention finds particular application to apparatus employing a foam consisting principally of water and air together with a relatively small proportion of a foam-stabilizing solution such as a solution of soap, commonly known to the art as "air foam". Prior methods and apparatus for the production and delivery of air foam are not readily adaptable to the introduction of the foam into sealed tanks or sealed tank systems. It is often requisite or desirable that tanks for volatile liquids be sealed from the atmosphere in order to prevent the escape of fumes. When foam boxes or ports are affixed to such closed tanks, it accordingly becomes necessary or desirable to provide means for effectively sealing the tank, but which will permit the introduction of foam whenever required. One manner of effecting a seal has been to place over the discharge end of the foam conduit a flammable diaphragm which will ignite and burn away in case of fire, thus breaking the seal and permitting the introduction of foam. The use of such a diaphragm is objectionable, however, in view of the fact that it does not permit the delivery of foam to a tank which has not become ignited but which is in imminent danger because of its proximity to a burning tank or by reason of its subjection to other fire hazards. Frequently it is desired to lay a protective blanket over the oil in storage tanks as, for example, when a fire is raging nearby, but when combustible diaphragms are relied upon to seal the foam conduit connections, this preventive measure is rendered impracticable if not altogether impossible.

Another expedient for sealing off the foam conduit connections has been to use frangible diaphragms designed to be broken by application of pressure built up when the foam-producing apparatus is started. This is an unsatisfactory arrangement because when the foam pressure is created the weakest diaphragm will break, permitting the discharge of foam and thereby reducing the pressure behind the other diaphragms sufficiently to prevent them from being broken. The result of this is an unbalanced flow which increases the length of time required to lay an effective blanket. Moreover, when air foam is used such an expedient is quite impracticable because of the extremely low pressure obtaining with this type of foam.

It is an object of my invention to provide apparatus for delivering an air foam to sealed tanks but which will not be subject to the limitations discussed above.

A general object of the invention is to provide an improved means for delivering an air foam to sealed tanks containing inflammable liquids such as oil or gasoline.

A specific object is to provide means for effecting the admission of air to foam-producing systems associated with sealed tanks in response to the application of pressure to operate the foam-producing units of such systems.

Other objects and advantages will appear as the description proceeds. In the drawings I have illustrated apparatuses representative of preferred embodiments of my improved apparatus.

Fig. 1 is a side elevational view, partly broken away in central vertical cross section, of my foam-producing and delivery apparatus as applied to the side wall of a tank containing an inflammable liquid; and Fig. 2 is a front elevational view of the same apparatus.

Figure 4:
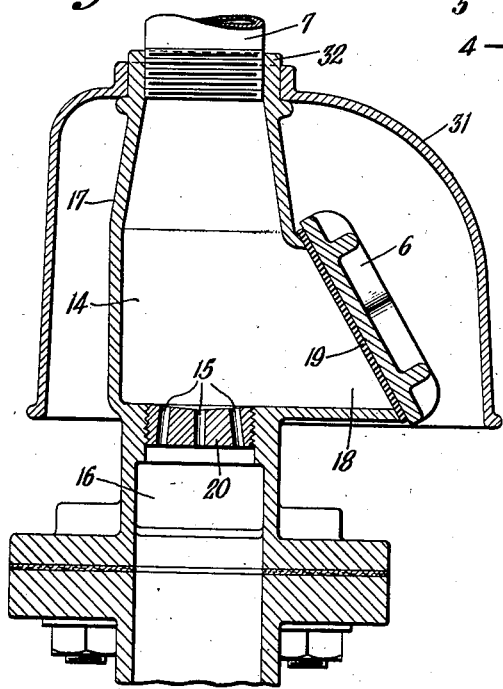
Figure 5:
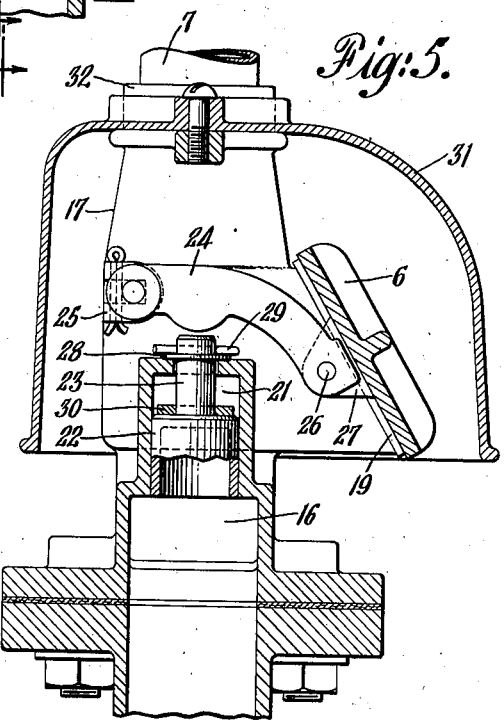

Figs. 3, 4, and 5 are detail sectional views of a portion of the apparatus shown in Figs. 1 and 2. Fig. 3 is a cross sectional view to an enlarged scale taken on the line 3—3 of Fig. 1 and showing the mixing chambers with associated structure. Fig. 4 is a transverse sectional view taken on the line 4—4 of Fig. 3; and Fig. 5 is a transverse sectional view taken on the line 5—5 of Fig. 3.

Figs. 6, 7, and 8 are views corresponding respectively to Figs. 3, 4, and 5 but illustrating another embodiment of the invention. Figs. 7 and 8 are transverse sectional views taken on the lines 7—7 and 8—8 respectively of Fig. 6.

Referring to Figs. 1 and 2, there is shown a portion of the side wall of a tank 1 for inflammable liquids. A foam-producing unit indicated generally by the reference numeral 2 is secured to the outside of the tank by means of a bracket 3. Water containing a foam-stabilizing agent or other foam-producing liquid is introduced through a pipe 4, passes through a strainer 5 and thence into a manifold for delivery to the mixing chamber or chambers of the unit 2 in the form of a jet or jets aspirating air through a port which with the parts in the position shown in Figs. 1 and 2 is closed by a cover 6. The foam thus produced in the mixing chamber or chambers of the unit 2 is forced upwardly through the conduit or conduits 7 for delivery to the tank. When a plurality of conduits 7 are provided as in the embodiment shown in Figs. 1 and 2, they preferably are joined together to form a single main conduit 8 at some point which conveniently may be near the point where the foam is to enter the tank.

The cross-sectional area of the main conduit 8 preferably is greater than the combined cross-sectional areas of the conduits 7 so that the rate of discharge of the foam will not be too great. The conduit 8 extends through the side wall of the tank, and near its discharge end is curved downwardly and outwardly as at 9 to direct the flow of foam against the inner wall of the tank. In practice a number of these foam producing units may be attached at spaced intervals around the sides of a tank, and the foam flowing down the side walls from the several units spreads over the surface of the liquid in the tank to join and form a continuous blanket effective to smother a fire or prevent the occurrence of a fire.

The discharge end 9 of the foam conduit preferably is formed as a separate member having a peripheral attaching flange 10 extending around the margin of an opening cut in the side wall of the tank. The main conduit member 8 is provided with a complementary peripheral flange 11. Sealing gaskets 12 are arranged between the flanges 10 and 11 and the wall of the tank, and the members 8 and 9 are drawn up against these gaskets by means of bolts 13, providing an effective seal and likewise cooperating with the bracket 3 to hold the foam-producing unit in place on the tank.

Any suitable method known to the art for the introduction of foam-stabilizing materials, either in solid form or in solution, into the liquid used for the production of foam may be employed in connection with the apparatus I have illustrated. I consider it preferable to use a method which permits the introduction of the foam stabilizing solution into a stream of water in accordance with the rate of flow of the water and without materially decreasing the line pressure. A method and apparatus which is particularly advantageous in securing this result is disclosed in my co-pending application Serial Number 166,937, filed October 2, 1937. It is considered that the liquid delivered by the pipe 4 of the apparatus shown in Figs. 1 and 2 contains a foam-stabilizing agent or is otherwise suited to the production of foam. The method of introducing the foam-stabilizing agent or the selection of the foam-producing liquid as the case may be, forms no part of the present invention.

The foam-producing unit 2 will now be described with reference to Figs. 3, 4, and 5. The unit 2 consists generally of a plurality of mixing chambers 14 into which discharge at high velocity the jets from nozzles 15 at the base of each chamber. The chambers 14 and a manifold 16 for delivering the foam-producing fluid to the nozzles 15, together with other associated structure to be described, may conveniently be formed as a unitary cast block 17. An air entry port 18 extends into each of the mixing chambers 14 (Fig. 4). A cover or damper 6 is arranged to seal the ports 18, and in the construction shown a single damper is arranged to close both of the ports. A sealing gasket 19 of flexible or resilient material is attached to the damper 6 or around the edges of the ports 18 to provide an air-tight seal. The nozzles 15 may be formed in a separate block 20 having a screw-threaded or other form of detachable engagement with the block 17.

Between the mixing chambers 14 is a cylinder 21 communicating with the manifold 16. A piston 22 is mounted for reciprocation in this cylinder in response to pressure applied to force the foam-producing liquid through the nozzles 15. Secured to the upper end of the piston 22 is a piston rod 23 extending through an aperture in the end wall of the cylinder 21 for engagement with a rocker arm 24. The rocker arm 24 is pivotally attached at one end to a fixed support, such as that provided by lugs 25 formed on the block 17, and its other end has a pivotal engagement at 26 with lugs 27 on the inside of the damper 6. The piston 22 is removably retained in the cylinder by a washer 28 and cotter-pin 29. A resilient washer 30 surrounds the piston rod at the head of the piston and serves as a buffer to absorb the shock when the piston is driven against the head of the cylinder by the pressure built up in the manifold. It likewise provides an additional seal preventing escape of any liquid which might be forced between the piston and cylinder walls.

A shield 31 may be provided to protect the operating mechanism from the weather and particularly from sleet or moisture which might accumulate and freeze or otherwise hinder the operation of the air port sealing door. As shown, this shield consists of a dome-shaped member having apertures in its top wall to surround the upper projecting ends 32 of the mixing chambers. The shield may be secured in place in any convenient manner as by means of the screw 33. Below the end of the shield 31 the block 17 may be provided with a pair of attaching lugs 34, and the complete unit may be secured in proper relationship to the attaching bracket 3 by means of bolts 35 which draw the lugs 34 against spacer sleeves 36 of appropriate length.

In the operation of this preferred form of apparatus embodying my invention, the air port or damper 6 normally will be held by gravity in the position shown in the drawings, effectively sealing the air entry ports 18 so that no vapors can escape from the tank and foam box system. Upon the application of pressure to the foam-producing liquid in the manifold 16, however, the resistance of the nozzles 15 is such that sufficient pressure is built up in the manifold to drive the piston 22 and its projection 23 upwardly against the rocker arm 24 to swing the latter about its pivotal connection with the lugs 25 and lift the cover 6 from its sealing engagement with the ports 18. When this occurs, air is aspirated through the ports 18 under the influence of the high velocity jets issuing from the nozzles 15. Under these conditions the liquid and air combine to form a foam which under the influence of the jets is forced upwardly through the conduits or foam pipes 7 and the adjoining conduit 8 to flow from the discharge end 9 of the conduit against the inside wall of the tank. The application of pressure to the foam-producing liquid in the delivery pipe 4 may be brought about manually by opening a valve (not shown), or by automatic means responsive to a thermostatic control located within or adjacent the tank. In the latter case a protective blanket of foam will be laid whenever the temperature within the tank is elevated dangerously close to the flash point of the liquid contained therein.

With reference to Figs. 6, 7, and 8, I shall now describe another embodiment of the invention. The foam-producing unit shown in these views is adapted to be used in conjunction with the foam conduits 7, 8, 9 and other related structure described with reference to Figs. 1 and 2. In other words, the foam-producing and sealing arrangement of Figs. 6, 7, and 8 may be substituted for the unit 2 of Figs. 1 and 2. A pair of mixing chambers 37 are provided, and at the base of each of these chambers is arranged a nozzle or plurality of nozzles 38 which may be formed in a removable block 39 similar to the block 20 previously described. The foam-producing liquid is delivered to the nozzles 38 through a pipe 40 and manifold 41. The mixing chambers 37 and manifold 41, together with the valve structure presently to be described, may conveniently be formed in a unitary cast block 42. Communicating with the manifold 41 in the block 42 is an expansible bellows 43 which may be mounted in any convenient manner as by means of a flange 44 connected to or formed as an integral part of the bellows, which flange is secured to the shouldered interior of the manifold 41 by means of screws 45. A sealing gasket 46 may be arranged between the attaching flange 44 and the shoulder in the manifold. The block 42 preferably is provided with a tubular extension 47 surrounding the bellows 43 and forming a protective housing therefor.

A passageway 48 adjoins each of the mixing chambers 37, these passageways being formed by an extension or extensions of the block 42. The bottom wall of these extensions is provided with ports 49 forming seats for valves 50. The stems 51 of the valves slidably engage cylindrical recesses 52 formed in a removable cover member 53 which may conveniently have a threaded engagement with an aperture in the upper wall of the extension which forms the passageway 48. The provision of the removable cover member 53 makes it possible to insert the valve 50 from above so that it will be arranged to open inwardly of the passageway 48. If desired, the valve 50 may be designed to be opened by the pressure of the atmosphere, relying upon the pressure differential obtaining by reason of the partial vacuum created by the high velocity jets issuing from the nozzles 38. I prefer, however, to provide means responsive to the pressure built up in the manifold 41 to provide positive means for lifting the valves 50 from their seats. To this end I have provided an operating linkage arranged for actuation by the bellows 43 which linkage is assisted, however, in its action by the aforesaid differential pressure. In my preferred embodiment of this form of valve actuating means, I provide each of the valves 50 with an extension 54 and connect these extensions together with a rod 55 (which preferably has a pivotal engagement with these extensions) so that the valves can be operated in tandem. A link 56 is secured at one end to the rod 55 and at its other end is pivotally attached to a rocker arm 57 which in turn is pivotally connected to a fixed member such as provided by lugs 58 on the block 42. Lugs 58 are so positioned that the rocker arm 57 is arranged to extend between the upper portions of the two mixing chambers 37. The bellows 43 is arranged for engagement with a round projection 59 formed on the rocker arm 57. The valve operating assembly is protected from the elements by a shield 60 which may be similar to that described in connection with the embodiment of Figs. 1-5 inclusive and which may be secured to the block 42 in a similar manner.

In the operation of apparatus constructed in accordance with this embodiment of my invention, pressure is applied to the foam-producing liquid in the pipe 40 and manifold 41 to force the liquid through the nozzles 38 and produce high velocity jets within the mixing chambers 37. The resistance of the nozzles 38 to the passage of the liquid is such that pressure is built up within the manifold 41 sufficient to expand the bellows 43 against the projection 59 of the rocker arm 57, lifting the valves 50 from their seats in the ports 49 against the action of gravity. This permits the aspiration of air through the ports 49 by the liquid jets in the mixing chambers, but as soon as the pressure in the line 40 is reduced to cut off the supply of foam to the tank, the valves 50 are permitted to drop back onto their seats. Thereafter any fumes which otherwise might escape from the tank are prevented from doing so by the valves 50. Any pressure built up within the tank tending to drive off fumes can only serve to force the valves 50 tighter against their seats.

It will be observed that the nozzles 38 in the apparatus disclosed in Fig. 7 are arranged in parallelism whereas the nozzles 15 disclosed in Figs. 3 and 4 converge toward the center of the mixing chamber. In some instances it may be desirable to use parallel nozzles in combination with the structure of Figs. 3 and 4 or to use converging nozzles in combination with the structure illustrated in Fig. 7. The parallel nozzles avoid impingement of the jets one upon another, and in certain applications they may be found preferable, this depending upon the liquid pressure used, or upon other variables.

In place of the valves 50, there might be employed glass-covered ports or ports covered by other frangible materials arranged to be broken upon the application of pressure to the fluid in the manifold or in the supply line. It will be apparent to those skilled in the art that other modifications might be made in the constructions which I have described specifically for the purpose of illustration. Throughout the specification, the terms and expressions which I have employed are used as terms of description and not of limitation and I have no intention of excluding such equivalents of the invention disclosed, or of portions thereof, as may fall within the purview of the claims.

I claim:

1. Apparatus for delivering a fire-extinguishing foam to sealed tanks containing inflammable liquids comprising a mixing chamber in sealed communication with the tank, means for producing a jet of foam-producing liquid in said chamber, said means comprising a nozzle and a passage leading thereinto, an air entry port in communication with said chamber, a closure arranged normally to seal said port, a bellows arranged in communication with said passage, said bellows being so constructed as to expand upon application of pressure to liquid in said passage, and means operatively connected to said closure for engagement with said bellows so that said expansion will break said air entry port seal.

2. In combination with a sealed tank for inflammable liquids, a jet producer of air foam adjacent said tank and in sealed communication therewith, said foam producer comprising an empty chamber, a restricted orifice in communication with the chamber for producing a jet of foam-producing liquid, an air entry port in communication with said chamber, a closure for said port, a conduit for delivering liquid to the orifice, a valve in the conduit at a point remote from the tank, and means responsive to pressure of the liquid in the conduit controlled by said valve for actuating said closure to permit aspiration of air by the liquid discharged from said orifice.

3. In combination with a sealed tank for inflammable liquids, a jet producer of air foam adjacent said tank and in sealed communication therewith, said foam producer comprising an empty chamber, a restricted orifice in communication with the chamber for producing a jet of foam-producing liquid, a normally sealed air entry port in communication with said chamber, a conduit for delivering liquid to the orifice, a valve in the conduit at a point removed from the tank, and means responsive to pressure of the liquid in the conduit controlled by said valve for breaking the air entry port seal to permit aspiration of air by the liquid discharged from said orifice.

4. In combination with a sealed tank for inflammable liquids, a jet producer of air foam adjacent said tank and in sealed communication therewith, said foam producer comprising a chamber, means for producing a jet of foam-producing liquid in said chamber, said means including a nozzle and a passage communicating with the inlet side of the nozzle, a normally sealed air entry port in communication with said chamber, a movable member in sealed communication with said passage, a conduit for delivering liquid to said passage, a valve in the conduit at a point removed from the tank, said movable member being arranged for actuation by the liquid in said passage to break the air entry port seal when said valve is opened and pressure applied to the liquid in said passage to force it through the nozzle.

LEWIS G. MORRIS TIMPSON.